United States Patent [19]

Jaeger

[11] 4,210,634

[45] Jul. 1, 1980

[54] GROWTH PROMOTING FISH FOOD COMPOSITION

[75] Inventor: Karl H. Jaeger, Obereggenen-Schallsingen, Fed. Rep. of Germany

[73] Assignee: Elkawi AG, Zug, Switzerland

[21] Appl. No.: 906,635

[22] Filed: May 16, 1978

[30] Foreign Application Priority Data

May 24, 1977 [CH] Switzerland .......................... 6413/77

[51] Int. Cl.$^2$ ...................... A61K 35/14; A61K 37/02
[52] U.S. Cl. .................................... 424/101; 424/177; 426/656
[58] Field of Search ................. 424/101, 177; 426/656

[56] References Cited

U.S. PATENT DOCUMENTS

| 3,466,367 | 9/1969 | Jaeger et al. | 424/95 |
|---|---|---|---|
| 3,576,643 | 4/1971 | Ayukawa et al. | 426/656 |
| 3,973,001 | 8/1976 | Jaeger et al. | 424/101 |
| 3,974,294 | 8/1976 | Schwille et al. | 426/41 |

*Primary Examiner*—V. D. Turner
*Attorney, Agent, or Firm*—Toren, McGeady and Stanger

[57] ABSTRACT

The rate at which conventional fish food is converted to body protein by a wide variety of growing fish is increased substantially when the food contains 0.05 to 0.5% by weight, on a dry basis, of an extract from the blood or an organ of a vertebrate animal capable of catalytically enhancing cell respiration in animal tissue and hydrolyzate of native protein having an average molecular weight of 2000 to 50,000 in an amount of 2 to 15 times the weight of the catalytically active extract.

9 Claims, No Drawings

GROWTH PROMOTING FISH FOOD COMPOSITION

This invention relates to aquiculture, and particularly to an improved food composition for fish and crustaceaus and to its use.

It is common practice to feed cultured fish pelletized, solid compositions containing, as principal active ingredients, 15 to 50 percent native protein, 2 to 5 percent fat, and 3 to 10 percent crude fiber together with minor amounts of adjuvants, such as minerals, vitamins, and/or trace elements. The rate at which the food is converted to body protein by the fish is relatively low, and the protein component of the food must be chosen among relatively expensive sources to avoid damage to the fish. Such cheap and plentiful protein sources as whey, casein, yeast, and algae are converted to no more than 40% body protein by fish normally cultured on an industrial basis, and they cannot constitute more than a relatively small portion of the total protein fraction in the food because of insufficient content of essential amino acids, unfavorable effects on the metabolism of the fish, and other side effects.

It is a primary object of this invention to provide a fish food composition which may be converted to body protein by fish at a higher rate than conventional feed, and which may contain large amounts of cheap protein sources not otherwise useful in comparable amounts.

Another object of the invention is the provision of a fish food composition which enhances the resistance of cultured fish to unfavorable environmental conditions and to infections.

In its basic aspects, the fish food composition of the invention contains, in addition to the afore-mentioned conventional ingredients 0.05 to 0.5 percent on a dry weight basis of at least one material capable of catalytically enhancing cell respiration in animal tissue which material is an extract of the blood or of an organ of a vertebrate, and a polypeptide composed of naturally occurring amino acid units, such as a hydrolyzate of a native protein, in an amount of 2 to 15 times the weight of the catalytic material, the polypeptide having an average molecular weight of 2000 to 50,000.

The preferred catalytic material is an extract of calf's blood having a molecular weight of less than 10,000 and prepared by the method disclosed in my earlier U.S. Pat. No. 3,973,001. However, extracts prepared from the spleen, liver, or thymus of a sexually immature mammal or from fetal tissue such as the placenta of a mammal is also effective. The preparation of these organ extracts has been disclosed in my earlier U.S. Pat. Nos. 3,466,367 and 3,937,816.

The polypeptides employed according to this invention are conveniently prepared by enzymatic or acid hydrolysis of native proteins. Both methods permit the average molecular weight of the resulting peptides to be held within the desired limits of 2000 to 50,000, a range of 10,000 to 30,000 being generally preferred. The enzymatic method disclosed in U.S. Pat. No. 3,974,294 yields suitable protein hydrolyzates. They may amount to 0.25% to 7.5% of the entire feed composition on a dry weight basis, and preferably constitute 1 to 2% of the composition, the corresponding preferred concentrations of the catalytic material being between 0.1% and 0.2%.

In the presence of the addition agents of the invention, the protein present as a principal nutrient in amounts of 15% to 50% may contain more whey and other inexpensive sources of protein than are otherwise tolerated by the cultured fish, and the fish resist unfavorable environmental conditions better than when fed conventional compositions.

Trouts are known to suffer from anemia when cultured in water colder than 4° C., and pulse frequency and red blood cell count drop sharply in conventionally fed trout in the winter at water temperatures of 1 to 2° C. When the water temperature thereafter rises in spring, up to 20% of the fish die. When fed the composition of this invention, trout may be cultured in very cold water without suffering from anemia and its sequels.

Under otherwise identical conditions, many species of fish convert the food composition of the invention to body weight at a significantly higher rate than conventional compositions, improvement by as much as 30% having been observed. Additionally, a larger protion of the feed is converted to body protein, and less fat is produced in the presence of the addition agents of this invention. The generally lower fat content of the fish improves the taste of their flesh, and permits it to be stored in the frozen state for very long periods without deterioration.

In preparing the fish food composition from its ingredients, the protein hydrolyzate is preferably mixed first with the trace elements, and the other ingredients of the composition, including the catalytic material, are intimately mixed with each other and with a small amount of water sufficient to produce a stiff paste which is then combined with the first mixture. Pellets, one to seven millimeters in diameter, are made from the composition so obtained and dried prior to storage and use. The coherence of the pellets may be improved by dissolving a small amount of gelatine in the water. If water-soluble whey powder provides much of the protein content, the pellet surfaces are preferably coated with a little oil or fat to prevent premature disintegration of the pellets upon contact with water.

Gelatine-bearing compositions may be foamed in a conventional manner to produce cellular pellets whose overall density is similar to that of water. Such pellets float in water and remain accessible to the fish for a relatively long period. Pellets that sink to the bottom are lost to many fish, such as carp.

The polypeptide and catalytic material of the invention may also be mixed with commercial fish feed of conventional composition by uniformly distributing the addition in the basis composition and thereafter making pellets from the mixture so obtained.

At least some of the benefits of this invention are available in fish cultures which derive a major portion of their nutrients from vegetation, phytoplankton, zooplankton, and the like. Measureable benefits are observed when the composition of the invention constitutes as little as ten percent of the nutrient intake of the fish.

The following Examples are further illustrative of the invention.

EXAMPLE 1

A fish food composition of the invention was prepared from the individual ingredients listed below with a small amount of water in the preferred manner described above, and the mixture so obtained was pelletized and dried.

| Sources of native protein: | | |
| --- | --- | --- |
| Fish meal | 28% | |
| Evaporated pressed fish juice | 5 | |
| Poultry meat meal | 6 | |
| Blood meal | 5 | |
| Feed-grade wheat flour | 10 | |
| Soybean flour, defatted | 15 | 69% |
| Protein hydrolyzate from slaughter house waste according to U.S. Pat. No. 3,974,294 | | 0.5% |
| Miscellaneous: | | |
| Wheat germ | 6% | |
| Greaves cake | 7 | |
| Soy bean oil | 1 | |
| Soy bean lecithin | 1 | |
| Lime | 3 | |
| Mixed vitamins and trace elements | 7 | |
| Tabletting lubricant (stearate) | 4 | |
| Calf's blood extract (45%) according to U.S. Pat. No. 3,973,001 | | 0.05% |

EXAMPLE 2

Two additional fish food compositions of the invention were prepared from identical ingredients in different mixing ratios by the method of Example 1:

| Sources of native protein: | | |
| --- | --- | --- |
| Fish meal | 3.0% | 3.8% |
| Evaporated pressed fish juice | 12.0 | 12.5 |
| Blood meal | 4.0 | 4.0 |
| Cattle meat meal | 9.0 | 9.0 |
| Feed-grade wheat flour | 18.0 | 18.5 |
| Defatted soybean grits | 34.0 | 34.2 |
| | 80.0% | 82.0% |
| Protein hydrolyzate from slaughter-house waste (horns, skins, hooves, feathers) | 2.0 | 1.0 |
| Miscellaneous | | |
| Corn starch | 14.0% | 14.0% |
| Soybean oil | 2.0 | 1.8 |
| Mixed vitamins and trace elements | 1.5 | 1.0 |
| Calf's blood extract | 0.5 | 0.2 |

EXAMPLE 3

Three fish food compositions employing inexpensive whey and casein as at least one third, and preferably more than one half of the protein sources were prepared in the same manner as above from the following ingredients:

| Sources of native protein: | | | |
| --- | --- | --- | --- |
| Sour whey powder | 34.0% | 30.0% | 30.0% |
| Powdered algae (Scenedesmus) | 32.0 | — | — |
| Casein | — | 25.0 | 28.0 |
| Defatted soybean grits | 26.4 | 30.0 | 30.0 |
| | 94.4% | 85.0% | 88.0% |
| Protein hydrolyzate (from slaughterhouse waste as in Example 1) | 2.0 | 3.0 | 0.5 |
| Miscellaneous | | | |
| Fat | 7.0 | 6.4 | 6.4 |
| Mixed vitamins and trace elements | 0.4 | 0.4 | 0.4 |
| Calf's blood extract | 0.2 | — | — |
| Thymus extract | — | 0.1 | — |
| Spleen extract | — | — | 0.05 |

EXAMPLE 4

Two groups of carps were raised under otherwise identical conditions on the foof composition of Example 2 containing 0.2% calf's blood extract and on the same food composition without the extract, but containing the protein hydrolyzate. The carps receiving the catalyst converted the same amojnt of food composition to substantially greater increases in body weight. The amount of additional protein in each kilogram of added body weight was 100–150 g in the conventionally fed fish, and about 200 g in the carps receiving the catalyst. Closely analogous results were achieved with brown trout

EXAMPLE 5

Forty young carps were placed in individual 40-liter glass tanks in which the water was replaced a 23° C. continuously at a rate of 3 liters per minute. Each animal was fed ten times daily at hourly intervals equal weights of a basic composition containing, on a dry weight basis:
  36% steamed corn grits
  25% steamed wheat grits
  18% steamed, defatted, soybean grits
  3% yeast, feed grade
  1% fish flour
  6% greaves cake
  9% animal meat meal
  1% mixed trace elements and minerals
  1% mixed vitamins The feed composition given a test group of twenty carps was supplemented with 0.2% calf's blood extract as a cell respiration catalyst and 0.5% protein hydrolyzate uniformly distributed among the other ingredients. Each animal was weighed at the beginning of the test period, thereafter three times at intervals of seven days, and ultimately after six weeks. The average weights of the carps in each group are listed below:

| Feeding days | Control group | Test group |
| --- | --- | --- |
| 0 | 240.5 g | 240.7 g |
| 7 | 272.3 | 274.6 |
| 14 | 310.4 | 319.6 |
| 21 | 352.4 | 370.7 |
| 42 | 512.75 | 554.3 |

Three representative fish from each group were killed after the fourth weighing. The fat content of each of the trhee carps of the test group was found by visual inspection to be significantly lower than that of each carp of the control group.

EXAMPLE 6

Four groups of adult carps were carefully matched as to age and weight. Each group contained both males and females. The fish were placed in individual glass tanks and fed four different compositions in the otherwise unchanged manner of Example 5. The basic composition was a commercial product. The other three compositions were supplemented with 0.1, 0.2, and 0.5% calf's blood extract and 1, 2, and 5% protein hydrolyzate.

The fish were killed at the end of the test period, and their livers were excised and examined chemically, macroscopically, and microscopically for fat content and fat distribution. Within each group, the livers of the females showed somewhat more fatty degeneration than the males. The livers in the control group contained the greatest amount of fat, those in the group fed 0.2% blood extract and 2% polypeptides the least.

Small and large drops of intracellular fat were found in all liver lobes of the control group. In the livers of the fish who received 0.1% calf's blood extract and 1% polypeptide, fat droplets were concentrated peripherally. 0.2% extract and 2% polypeptide caused uniform, intracellular distribution of few fat droplets in all liver lobes. With 0.5% blood extract and 5% protein hydrolyzate, the distribution of fat droplets was as at 0.2% blood extract, but there was about as much fatty degeneration as at 0.1% blood extract, though substantially less than in the control group.

The liver parenchyma of the control group contained fat deposits amounting to approximately 30%. In the best test group (0.2% calf's blood extract and 2% polypeptide), the deposited fat amounted to approximately 7-8%.

The taste of the freshly killed and cooked carp meat of lower fat content was distinctly superior to that of the control group. After freezer storage for several months, the meat of the control group had a rancid taste while the taste of the best test group was virtually unchanged.

EXAMPLE 7

Two groups of 50 rainbow trouts each were kept in individual glass tanks in which the water was replaced continuously at 6° C. and contained niclosamide, a teniacide [(N-2'-chloro-4-nitrophenyl)-5-chloro-salicylamide] at three times the normally recommended concentration. A control group was fed a commercial food composition whose protein source mainly consisted of fish meal. The test group was fed at the same rate with the same composition which had been supplemented with 0.2% calf's blood extract and 2% protein hydrolyzate.

Eight fish of the control group died, and all showed disturbances of equilibrium and orientation. The fish of the test group were not visibly affected. In view of the finding in other tests that the catalytic extracts of the invention, when present in their food, permit fish to tolerate low oxygen concentrations in the ambient water which seriously affect conventionally fed fish, it is assumed that the greater resistance of the trouts to side effects of the antihelmintic drug is due to better utilization of oxygen in the livers of the fishes which were fed according to this invention.

EXAMPLE 8

The respective trout populations of two unconnected, but closely similar brooks were fed for six summer and fall months the commercial feed composition and the supplemented composition referred to in the preceding Example. During the following winter, a significant portion of the trouts in the control brook was lost due to viral and bacterial infections as is normally expected. The loss among the trouts of the test group was 30% lower indicating a prophylactic effect of the supplemented food composition.

Limited, but consistent tests indicate that the beneficial results illustrated above with reference to carps and trouts are equally available with other fresh water fish including grass fish, catfish, and eels, but also salt water fish and pet fish cultured for their decorative appearance rather than as a source of edible protein. Moreover, feeding tests with brine shrimps and several species of edible perineids show enhanced growth in the presence of the addition agents of the invention as compared to crustaceans cultured under otherwise identical conditions, but without the addition agents.

What is claimed is:

1. In a fish food composition containing, as principal active ingredients, 15 to 50 percent native protein, 2 to 5 percent fat, and 3 to 10 percent of at least one adjuvant selected from the group consisting of crude fiber, minerals, vitamins, and trace elements, the improvement which comprises said composition containing 0.05 to 0.5 percent of at least one material capable of catalytically enhancing cell respiration in animal tissue, and a polypeptide composed of naturally occurring amino acid units, the weight of said polypeptide being between 2 and 15 times the weight of said material, said percent values being based on the weight of said food composition on a dry basis, said material being an extract of the blood of a vertebrate animal, said polypeptide having an average molecular weight of 2000 to 50,000, the composition being useful for enhancing the protein to fat ratio in fish.

2. The composition of claim 1 wherein said material consists essentially of an extract of calf's blood.

3. The composition of claim 1 wherein the amount of said material is between 0.1 and 0.2 percent, and said average molecular weight is between 5,000 and 30,000.

4. The composition of claim 3 wherein said polypeptide is a hydrolyzate of a native protein.

5. The composition of claim 1 wherein said protein present as a principal active ingredient is contained in said composition in the form of at least one member of the group consisting of whey, protein, casein, fish meal, dried fish, fish extract, meat meal, poultry meal, feather meal, soybean and cereal grits, powdered yeast, powdered algae, molasses, and vegetal extract.

6. The composition of claim 1 wherein whey or casein constitutes the source of at least one third of the native protein present as a principal active ingredient.

7. The composition of claim 6 wherein said whey or casein constitutes the source of at least one half of said native protein.

8. A method of culturing fish which comprises feeding to said fish the composition of claim 1 in an amount sufficient to constitute at least ten percent of the nutrient intake of said fish.

9. The method of claim 8 wherein said composition constitutes substantially the entire nutrient intake of said fish.

* * * * *